Dec. 26, 1961 E. T. HUMBY ET AL 3,014,728

AUTOMATIC RECORD-CHANGERS

Filed April 4, 1960 5 Sheets-Sheet 1

Inventors
E. T. Humby
K. C. Bone
By Holcombe, Wetherill & Brisebois
Attorneys

Inventor
E. T. Humby
K. C. Bone
By
Holcombe, Wetherill & Brisebois
Attorneys

Dec. 26, 1961

E. T. HUMBY ET AL 3,014,728

AUTOMATIC RECORD-CHANGERS

Filed April 4, 1960

5 Sheets-Sheet 3

Inventor
E. T. Humby
K. C. Bone
By
Holcombe, Wetherill & Brisebois
Attorneys

Dec. 26, 1961

E. T. HUMBY ET AL 3,014,728

AUTOMATIC RECORD-CHANGERS

Filed April 4, 1960

5 Sheets-Sheet 4

Inventors
E. T. Humby
K. C. Bone
By [signature]
Attorneys

Dec. 26, 1961 E. T. HUMBY ET AL 3,014,728

AUTOMATIC RECORD-CHANGERS

Filed April 4, 1960 5 Sheets-Sheet 5

Inventor
E. T. Humby
K. C. Bone
By
Attorneys 3,014,728
Patented Dec. 26, 1961

3,014,728

AUTOMATIC RECORD-CHANGERS

Edward Thomas Humby, Emerson Park, Hornchurch, and Kenneth Charles Bone, Leigh-on-Sea, England, assignors to Collaro Limited Filed Apr. 4, 1960, Ser. No. 19,700
Claims priority, application Great Britain May 4, 1959
4 Claims. (Cl. 274—10)

In one type of automatic record changer a change-cycle mechanism which brings about all the operations which take place when a record is changed includes a disc which is rotated through one complete revolution during each cycle of operations by the main driving motor of the record changer.

One particular example of this type of record changer is shown in United States patent application Serial No. 688,950, now Pat. No. 2,981,906, and in this example the disc has a number of cam grooves along which a cam follower moves and this in turn moves various members in the change-cycle mechanism when the disc is rotated.

The rotary disc must be accurately located in a datum angular position during the time that a record is being played; that is after a cycle of operations has been completed. This location is usually brought about by a co-operating notch and a roller, one of which is on a movable member and the other of which is on the disc. The movable member is spring-loaded and this causes the roller to be held in the notch to locate the disc when the change-cycle mechanism is not in operation.

A stop mechanism is provided for stopping the driving motor of the record changer after the last record in the magazine of the record changer has been played and the pickup arm has been returned to its rest.

In the record changer described and illustrated in United States patent application Serial No. 688,950, the stop mechanism is also brought into action by rotation of the disc. This is effected by a lug which is movably mounted on the disc. Normally the lug is in an inactive position, but when the last record has been moved onto the turntable a mechanism is operated which moves the lug to an active position. The lug may be moved in any one of a number of different ways. In the record changer described in United States patent application Serial No. 688,950, the movement is brought about by a cam follower arm which moves with the pickup arm. After the last record has been moved onto the turntable this cam follower arm is caused to move round a different cam groove on the rotary disc from that which it normally follows when there is at least one record remaining in the magazine. When the cam follower arm moves around this different cam groove it comes into contact with a member which is connected to the lug. This rocks the member about a pivot on the disc and so moves the lug.

Alternatively, however, the mechanism for moving the lug may be actuated by an arm for balancing the records on a magazine spindle. This is a quite well known mechanism and operates in the following manner.

When the last record on the magazine spindle falls onto the turntable the balancing arm no longer has any support and also falls. This moves an actuator into the path of a member pivoted on the disc and connected to the lug. In this way as the disc rotates the member is rocked and the lug is moved in a manner similar to that in which it is moved by a follower arm connected to the pickup arm as already described.

The present invention is concerned with a stop mechanism for an automatic record changer having a driving motor and a change-cycle mechanism which includes a disc which is rotated by the motor once during each cycle of operations as already described.

According to the present invention the disc is located in a datum position, whilst a record is being played, by a follower on the disc which engages in a notch in a spring-loaded pivoted arm and a stop mechanism for stopping the motor after the last record in the magazine of the record changer has been played, includes a lug movably mounted on the disc and means for moving the lug from an inactive to an active position on the disc, the spring-loaded pivoted lever being oscillated by the follower as the follower moves into the notch and the lever reciprocating a floating member which has a part in the path of the active position of the lug, the lug, when in its active position striking the floating member as the disc rotates, and thus moving the member laterally into a position in which the member comes into engagement with and moves a switch member to stop the motor when the floating member follows the movement of the pivoted lever as the follower enters the notch.

Preferably the floating member is spring-loaded in one direction of its reciprocating movement and is positively moved in the opposite direction by the notched lever. The notched lever may act on the floating member through a second pivoted lever which has a projection which engages with an abutment on the floating member to form a lost motion connection. When the lug is in its inactive position, the floating member in its movement comes up against a stop and the projection, which moves the floating member, moves to and fro through a larger stroke than does the member itself. When the lug is in its active position and moves the floating member laterally, the member is moved off the stop and performs an additional movement in the direction of its reciprocating movement under the action of its spring. The stop then engages with another part of the floating member and keeps it in its laterally moved position until it performs its return reciprocating movement. It is during this return movement that the floating member moves the switch member to stop the motor.

A record changer in accordance with the invention will now be described by way of example only with reference to the accompanying drawings, in which.

Figure 1:
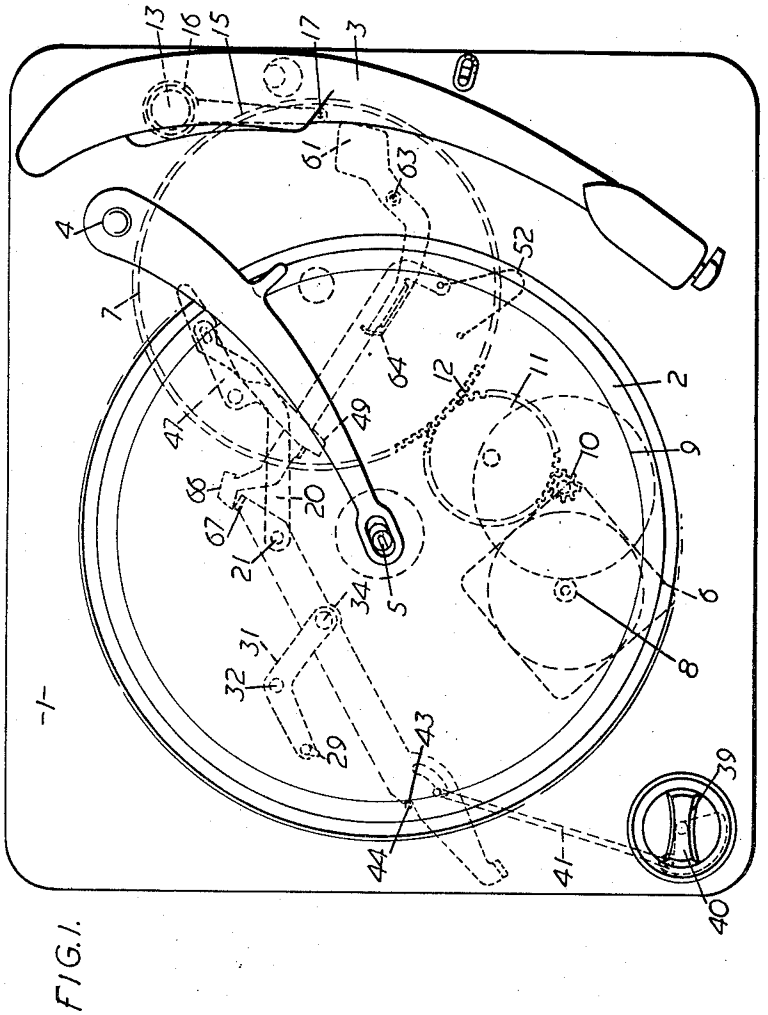
FIGURE 1 is a plan view of the record changer.

As shown in FIGURE 1 of the drawings the record changer comprises a base board 1 on which a turntable 2, a pickup arm 3 and a balance arm 4 are mounted. A magazine spindle 5 for supporting a stack of records to be played projects upwards from the centre of the turntable.

The record changer is driven by an electric motor 6 which rotates the turntable and also operates a change-cycle mechanism. The change-cycle mechanism is similar to that described in United States patent application No. 688,950 and comprises a disc 7 which is rotated through one complete revolution in each record change-cycle by the motor 6, a spindle 8 of which drives a rubber idler wheel 9 fixed to a pinion 10, which in turn rotates a further pinion 11 which meshes with teeth 12 on the edge of the disc 7.

The pickup arm 3 is fixed on a spindle 13 to the bottom of which a cam follower arm 15 is connected through a friction clutch 16. The cam follower arm 15 has a pin 17 at its outer end which moves along one of a number of cam grooves in the surface of the disc 7 in a manner described in United States patent application Serial No. 688,950.

When the change-cycle mechanism is inactive; that is to say during the time that a record on the turntable is being played, the disc 7 is located in a datum angular position by engagement of a follower in the form of a roller 18 mounted on its upper surface in a notch 19 formed in the edge of a lever 20 which is mounted on a pivot pin 21 projecting downwards from the bottom of the base board 1. Near its end remote from the pivot 21 the lever 20 has a pin 22 which projects upwards through a slot 23 in the base board 1. A coiled tension spring 24 extends from the pin 22 to a pin 25 which is fixed to the top surface of the base board 1. The spring 24 tends to pull the lever 20 in a clockwise direction about its pivot 21 at all times. The roller 18 is thus resiliently held in position in the notch 19.

Figure 2:
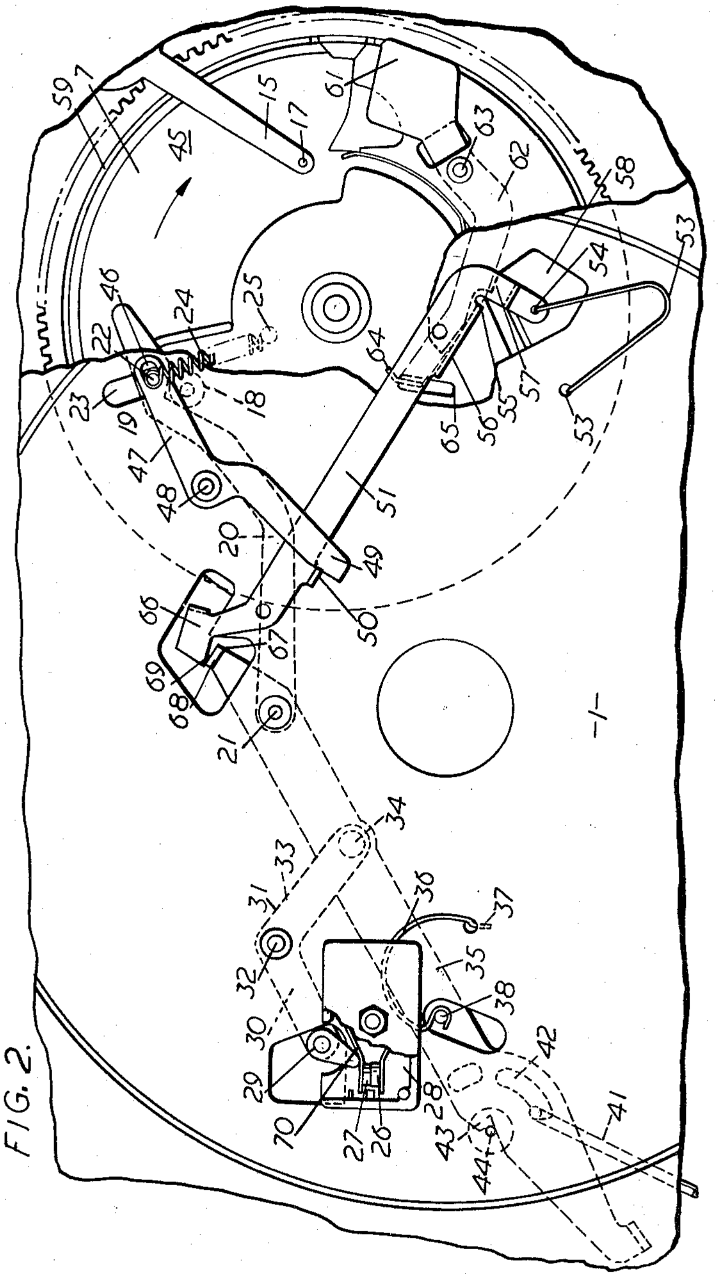
FIGURE 2 is a plan view to a larger scale of a part of the record changer with the turntable removed and part of the base board cut away to show relevant parts of the change-cycle mechanism.

When the record changer is in operation and a record is actually being played the illustrated parts of the change-cycle mechanism are in the positions illustrated in FIGURE 2 of the drawings. Contacts 26 and 27 of a switch 28 in the circuit of the motor 6 are held closed by a buffer 29 fixed on the end of an arm 30 of a bell crank lever 31 mounted on a pivot pin 32 projecting downwards from the underside of the base board 1. The second arm 33 of the bell crank lever 31 is pivotally connected by a pin 34 to a switch member 35 which is urged in a direction towards the bottom left-hand corner of FIGURE 2 of the drawings by a spring 36, one end of which engages in a hole 37 in the base board 1 and the other end of which is fixed to a pin 38 projecting upwards from the switch member 35. To switch the record changer on initially the switch member 35 is moved into the position shown in FIGURE 2 of the drawings against the action of the spring 36 by rotating a manual control knob 39 (see FIGURE 1) in a clockwise direction. The manual control knob 39 moves the switch member 35 upwards and to the right as seen in FIGURE 2 of the drawings by means of a crank arm 40 and a connecting rod 41, a downwardly bent end of which engages in a slot 42 in the switch member 35. The connecting rod 41 also tends to push the left-hand end of the switch member 35 upwards so that when the switch member 35 has been moved to the right into the position shown in FIGURE 2 a shoulder 43 on the switch member 35 is moved into engagement with a pin 44 projecting downwards from the base board 1. This holds the switch member 35 in the position shown in FIGURE 2 of the drawings.

Whilst a record is being played the pin 17 at the end of the cam follower arm 15 is in a depression 45 of substantial area in the top surface of the disc 7. The movement of the cam follower arm is thus not obstructed in any way and the pickup arm 3 is free to move inwards as the stylus travels along the spiral groove of the record.

When playing of the record is finished, however, the disc 7 is rotated by the motor 6 acting through the mechanism already described, and the pickup arm is lifted by a mechanism operated by the cam disc 7, but which is not described here because it does not form part of the present invention.

As the disc starts to rotate the roller 18 is moved out of the notch 19. This causes the lever 20 to be rocked in a counter-clockwise direction about its pivot 21 against the action of the spring 24. The pin 22 extends upwards through a slot 46 in a lever 47 pivoted on a pin 48 extending upwards from the base board 1. The lever 47 is thus also rocked in a counter-clockwise direction. This moves an arm 49 of the lever 47 downwards and to the right as seen in FIGURE 2 away from an abutment 50 on a floating member 51 which slides on the top surface of the base board 1. This allows the floating member 51 to be moved towards the right as seen in FIGURE 2 of the drawings by a U-shaped spring 52, one arm of which engages in a hole 53 in the base board 1 and the other arm of which engages in another hole 54 in the end of the member 51. The movement of the floating member 51 to the right is, however, restricted by the engagement of the end 55 of a down-turned flange 56 on the member with a shoulder 57 formed on the edge of an irregularly shaped opening 58 in the base board 1. The shoulder 57 acts as a stop. After movement of the floating member 51 is restricted by the shoulder 57, the arm 49 of the lever 47 moves out of contact with the abutment 50 with a lost motion. As the roller 18 moves clear of the end of the lever 20, the lever 20 and with it the lever 47, are rotated again in a clockwise direction by the spring 24. This brings the floating member 51 back into the position shown in FIGURE 2 of the drawings.

Figure 3:
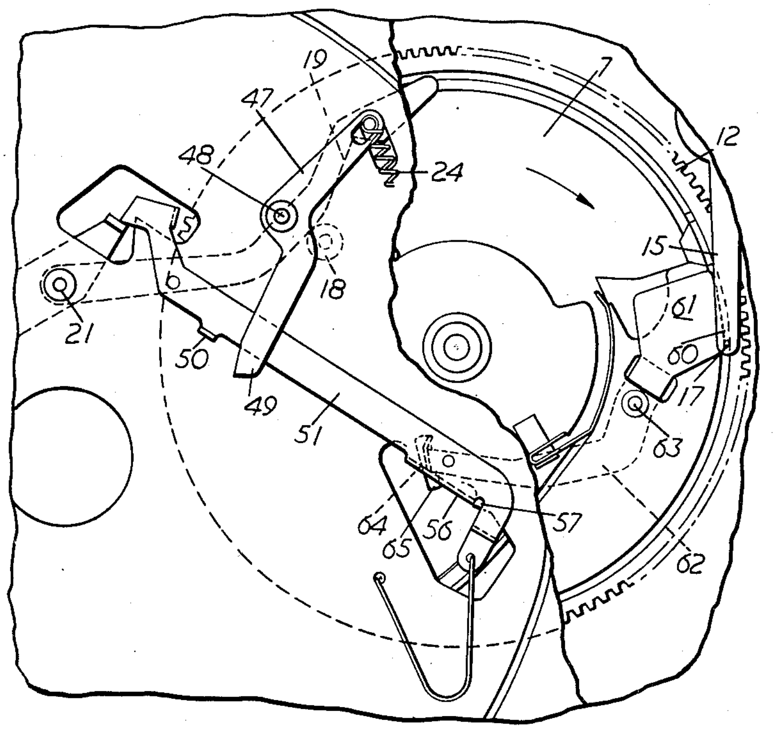
FIGURE 3 is a plan showing part of the mechanism shown in FIGURE 2, but at a later stage in the cycle of operations of the change-cycle mechanism.
Figure 4:
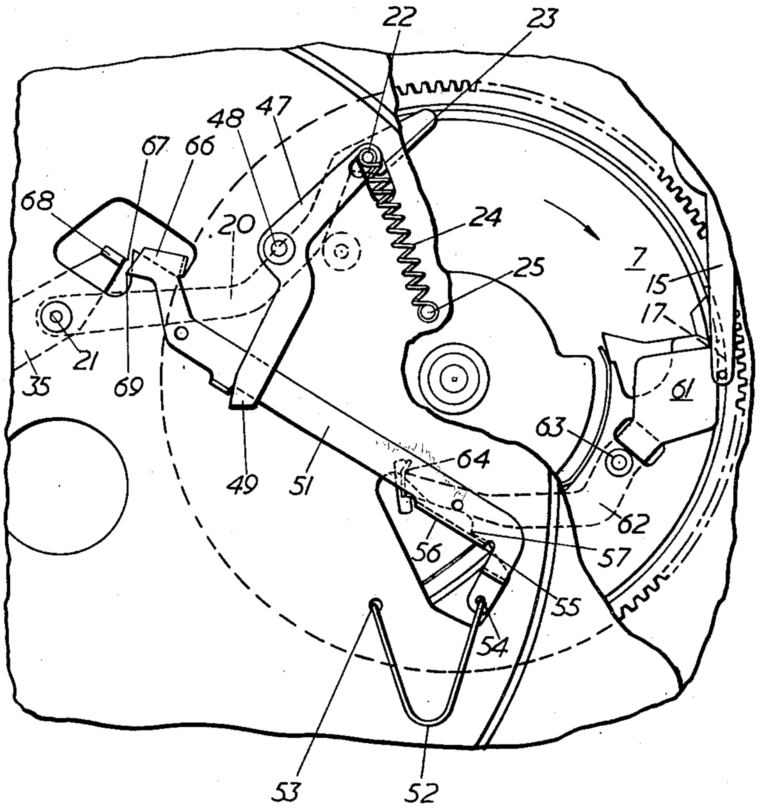
FIGURE 4 is a view similar to FIGURE 3, but showing a still later stage in the cycle of operations.
Figure 5:
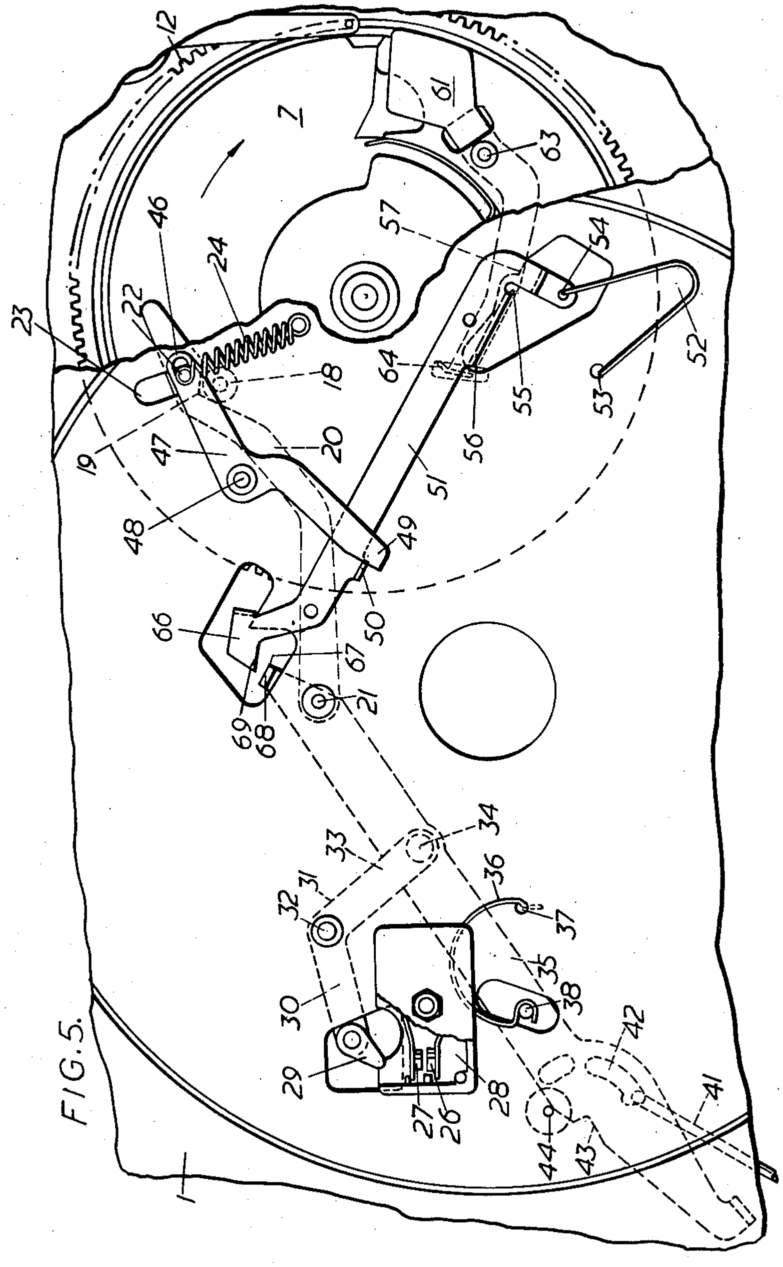
FIGURE 5 is a view similar to FIGURE 2, but showing a final stage in the cycle of operations.

When the disc 7 comes towards the end of its revolution the roller 18 again comes into contact with the lever 20, but this time on the left-hand side of the notch 19. The lever 20 is again rotated in a counterclockwise direction and this brings about the movement of the floating member 51 just described. As the roller 18 engages in the notch 19 again, the parts again return to the position shown in FIGURE 2. When, however, the last record on the magazine spindle 5 has been played, and the disc 7 starts to rotate, the pin 17 on the arm 15 moves into a peripheral groove 59 running around the outside of the disc 7. As the disc 7 rotates, the pin 17 comes into the position shown in FIGURE 3 of the drawings in which it engages with an edge 60 on the enlarged end 61 of a lever 62 which is mounted on a pivot 63 on the disc 7. The lever 62 is fixed to a lug 64 which projects upwards through a slot 65 in the disc 7. This moves the lug 64 from an inactive position, shown in FIGURE 2 of the drawings, where the lug is in the inner end of the slot 65, into an active position, shown in FIGURES 3 to 5 of the drawings, nearer the outer end of the slot 65. With the lug 64 in its active position, as shown in FIGURE 3 of the drawings, when the roller 18 comes into contact with the lever 20, the lever 20 and with it the lever 47, are rotated in a counter-clockwise direction as was previously the case, and again the end 55 of the down-turned flange 56 comes into contact with the shoulder 57. At the moment that this happens, however, the lug 64 comes into engagement with the upper face of the down-turned flange 56 and pushes the floating member 51 downwards so that the end 55 of the flange 56 is moved downwards off the shoulder 57. As soon as this happens the spring 52 moves the floating member 51 further downwards and to the right into the position shown in FIGURE 4 of the drawings. This causes a head 66 on the floating member 51 to be withdrawn into a position immediately adjacent the edge 67 of an upwardly-bent end 68 of the switch member 35. As the floating member 51 is moved into the position shown in FIGURE 4 by the spring 52, it is also rocked slightly in a counter-clockwise direction to move the head 66 slightly downwards as well as to the right. Now with the floating member 51 in this new position, as the roller 18 enters the notch 19 and the levers 20 and 47 are rotated in a clockwise direction, the head 66 comes into engagement with the edge 67 and pushes the right-hand end of the switch member 35 upwards and to the left. This could not previously happen because the tip 69 of the head 66 merely slid backwards and forwards on the upwardly-bent end 68 without being able to engage with the edge 67 to move the member 35. The movement of the right-hand end of the switch member 35 upwards and to the left causes the member 35 to pivot about the pin 34. This moves the shoulder 43 on the member 35 out of engagement with the pin 44. Immediately this happens the member 35 is moved downwards and to the left by the spring 36 into the position shown in FIGURE 5 of the drawings. This rotates the bell crank lever 31 in a clockwise direction and moves the buffer 29 away from a spring arm 70 carrying the contact 27. This allows the contact 27 to move away from the contact 26 so that the switch 28 in the motor circuit is opened. As this happens, the disc 7 is returned to its initial datum position by the spring 24 causing the roller 18 to move right into the bottom of the notch 19.

The mechanism can be re-set again into the position shown in FIGURE 2 of the drawings by rotating the control knob 39 in a clockwise direction as already described.

We claim:

1. In an automatic record changing phonograph comprising a driving motor, a record magazine, a change cycle mechanism for causing records in said magazine to be played in succession, and a stop mechanism for stopping said motor after the last record in said magazine has been played, said change cycle mechanism including a disc, means operatively connecting said disc to said driving motor to cause said disc to perform one complete revolution in each record change cycle and means for locating said disc in a datum position between record change cycles, said locating means comprising a spring loaded lever pivotally mounted adjacent said disc, said lever being formed with a locating notch, a follower on said disc positioned to engage in said notch once during each revolution of said disc, and to swing said lever as it approaches said notch, the improvement whereby said stop mechanism includes a floating member mounted for back and forth movement in response to swinging of said lever, means for guiding said floating member into a first path of travel during said movement, a lug movably mounted on said disc for movement between an inactive position clear of said first path and an active position in which it diverts said floating member into a second path, a switch for stopping said motor, switch actuating means extending into said second path for actuation by movement of said floating member therein, and means for moving said lug from inactive to active position when said disc becomes empty.

2. A record changer according to claim 1, in which the floating member is spring-loaded in one direction of its back and forth movement and is positively moved in the opposite direction by the notched lever.

3. A record changer according to claim 1, comprising a second pivoted lever through which the notched lever acts on the floating member, said second pivoted lever having a projection which engages with an abutment on the floating member to form a lost motion connection.

4. A record changer according to claim 3, in which said guiding means comprises a fixed stop with which the floating member comes into contact during the course of its movement along said path effected by the spring, said lug when in its active position, guiding the floating member to one side of the stop and into said second path, thus allowing an additional movement to be effected by the spring, said stop then guiding the floating member along said second path in which it moves said switch actuating means on its return movement.

References Cited in the file of this patent

UNITED STATES PATENTS

| | | |
|---|---|---|
| 2,295,092 | Offen | Sept. 8, 1942 |

FOREIGN PATENTS

| | | |
|---|---|---|
| 757,303 | Great Britain | Sept. 19, 1956 |
| 757,379 | Great Britain | Sept. 19, 1956 |
| 788,054 | Great Britain | Dec. 23, 1957 |